No. 761,720. Patented June 7, 1904.

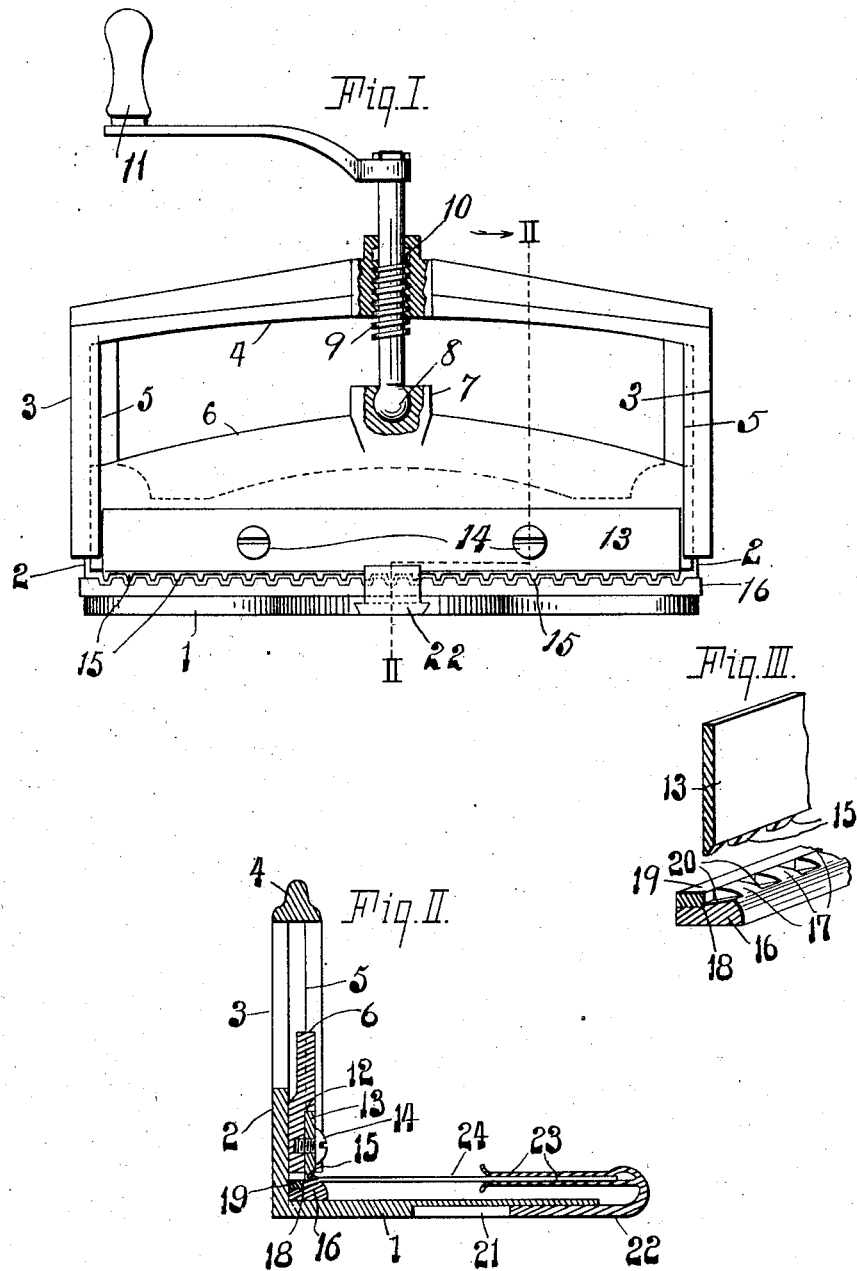

UNITED STATES PATENT OFFICE.

JOHN SPERBER, OF PITTSBURG, PENNSYLVANIA.

SAW-SET.

SPECIFICATION forming part of Letters Patent No. 761,720, dated June 7, 1904.

Application filed May 26, 1903. Serial No. 158,800. (No model.)

*To all whom it may concern:*

Be it known that I, JOHN SPERBER, a citizen of the United States, residing at Pittsburg, in the county of Allegheny and State of Pennsylvania, have invented or discovered new and useful Improvements in Saw-Sets, of which the following is a specification.

In the accompanying drawings, which make part of this specification, Figure I is a front elevation of my invention, a portion being broken away to show the actuating mechanism; Fig. II, a vertical section on the line II II of Fig. I, and Fig. III a perspective of a fragment of the setting-dies and gage.

My invention relates to a machine for setting the teeth of saws; and its object is to provide a saw-set which will set a large number of teeth simultaneously on both sides and which has exchangeable parts by means of which saws having teeth of different sizes may be set.

Further objects will appear in the detail portion of the description.

Referring to the drawings, 1 is a base-plate having the vertical back plate 2, above which are the end extensions 3 thereof. The tops of the extensions are connected by the cross-bar 4.

On the front of the back plate 2 and of the extensions 3 are vertical guides 5, in which reciprocates the carrier or head 6, extending substantially the full length of the base-plate 1. The ends of the carrier lie in the guides 5. The carrier 6 has a projection 7 at its center, longitudinally considered, in which the head 8 of the screw 9 is swiveled. The screw has its threaded portion in the threaded hole 10 in the cross-bar 4 and is provided with a handle 11. In the recess 12 in the lower front part of the carrier is the upper die 13, secured to the carrier by the screws 14. The lower edge of the die 13 has a series of teeth 15, which are spaced apart to correspond with the spaces between the teeth of the saws to be set. Beneath the die 13 is a removable lower die 16, having teeth 17 spaced apart the same as the teeth of the upper die. The upper back corner of the die 16 has a recess 18, which runs from end to end of the die and in which is seated a brass or copper gage 19, which the ends of the teeth touch when the saw is in position for setting the teeth. The teeth 15 of the die 13 have their fronts tapered downwardly and rearwardly, and the teeth 17 of the die 16 are inclined or rounded downwardly and forwardly, and the recesses 20 between the teeth 17 have their bottoms inclined downwardly and rearwardly. The dies 13 and 16 will be exchanged for dies having the proper width and depth of teeth when saws having different sizes of teeth are to be set, and the gage 19 will also be exchanged, if necessary, for another one having the proper height and width.

In the bottom of the base 1 is a dovetailed groove 21, extending at a right angle to the length of the dies. In this groove is a slidable saw-holder 22, having an upper recurved portion with the jaws 23, between which the saw 24 is held during the operation of the dies.

The operation of my saw-setting machine is as follows: I provide dies 13 and 16, having teeth corresponding to the teeth of the saw to be set, and after inserting the gage 19 in the groove 18 I place the lower die under the upper die, so that the teeth 15 will lie directly over the recesses 20 in the die 16. I then place the saw 24 on the die 16 with the saw-teeth over the teeth 17 and recesses 20 of the die 16 and against the gage 19. The holder 22 is then shoved in, so that the jaws 23 support the saw, as shown in Fig. II. The handle 11 is then turned so as to bring the teeth 15 down upon the saw-teeth, the teeth 15 bending alternate saw-teeth down into the recesses 20 and the teeth 17 bending the remaining saw-teeth up into the recesses between the teeth 15, as shown on Fig. II. The die 13 will then be raised and the saw moved along so as to present another series of teeth to the dies 13 and 16, whereupon the said dies will again be closed, and so on until all the saw-teeth have been set.

I do not desire to be limited to the precise form which the several parts of my invention assume on the drawings, as many changes may be made while still retaining the spirit thereof. The carrier may be actuated by lever mechanism, if desired, and the dies and holder varied to some extent without departing from the principles of my invention.

Having described my invention, I claim—

1. In a saw-set, a base-plate, having a back plate thereon, a reciprocating head provided with a die having a plurality of saw-setting teeth, a second die seated on the base-plate and having a plurality of teeth coöperating with the teeth of the other die, and a gage-bar loosely seated in a recess of the second die and abutting against said back plate.

2. In a saw-set, a base-plate, having a back plate thereon, a removable toothed die seated in the angle made by said plates, said die being slotted between the teeth and the back plate, and a gage-plate loosely seated in said slot.

Signed at Pittsburg, Pennsylvania, this 20th day of May, 1903.

JOHN SPERBER.

Witnesses:
F. N. BARBER,
A. M. STEEN.